United States Patent [19]

Miyazaki et al.

[11] 4,350,937
[45] Sep. 21, 1982

[54] MOTOR SPEED CONTROL DEVICE FOR DC MOTOR

[75] Inventors: Kiyoshi Miyazaki, Komagane; Tsuneto Takeuchi; Jinichi Ito, both of Ina; Hiroo Ashibe, Nagano, all of Japan

[73] Assignee: Kabushiki Kaisha Sankyo Seiki Seisakusho, Nagano, Japan

[21] Appl. No.: 174,429

[22] Filed: Aug. 1, 1980

[30] Foreign Application Priority Data

| Aug. 4, 1979 | [JP] | Japan | 54/99620 |
| Aug. 31, 1979 | [JP] | Japan | 54/120224[U] |
| Sep. 4, 1979 | [JP] | Japan | 54/122205[U] |
| Sep. 6, 1979 | [JP] | Japan | 54/123169[U] |
| Nov. 7, 1979 | [JP] | Japan | 54/154468[U] |
| Nov. 12, 1979 | [JP] | Japan | 54/156744[U] |

[51] Int. Cl.³ .............................................. H02P 5/16
[52] U.S. Cl. ............................ 318/331; 318/345 CA
[58] Field of Search ........................ 318/331, 345 CA

[56] References Cited

U.S. PATENT DOCUMENTS

| 3,521,140 | 7/1970 | Kobayashi et al. | 318/331 |
| 3,560,828 | 2/1971 | Kobayashi et al. | 318/332 |
| 3,624,493 | 11/1971 | Gatley | 323/22 T |
| 4,189,666 | 2/1980 | Tetsuga et al. | 318/331 |

Primary Examiner—David Smith, Jr.
Attorney, Agent, or Firm—Sughrue, Mion, Zinn, Macpeak & Seas

[57] ABSTRACT

A motor speed control device for a small DC motor in which the speed of rotation of the motor is maintained stable during ambient temperature changes and changes in the load applied to the motor. A temperature compensation resistor is coupled in series with a voltage divider circuit and the combination thereof coupled across the motor. A motor control circuit is provided having first through fourth control terminals. The first control terminal is coupled to the junction between the temperature compensation resistor and the voltage divider circuit, the second control terminal to the voltage division point, the third control terminal to the junction between the voltage divider circuit and the motor, and the fourth control terminal is coupled to ground. The motor control circuit includes an error detecting circuit having inputs coupled to the first and second control terminals with a voltage reference source coupled in series with the first input terminal to the error detecting circuit. The output of the error detecting circuit drives both shunt transistors coupled between the first and fourth control terminals and a drive transistor means coupled between the first and fourth control terminals.

12 Claims, 12 Drawing Figures

MOTOR SPEED CONTROL DEVICE FOR DC MOTOR

BACKGROUND OF THE INVENTION

The present invention relates to a speed control device for a DC motor which utilizes a DC motor speed controlling circuit such as an IC circuit to control the speed of a DC motor.

In general, the speed of a DC motor may be controlled by comparing a voltage which is proportional to the rate of rotation or speed of the motor with a reference voltage. A DC motor utilizing a constant strength field can be equivalently represented by a series combination of its internal resistance $R_o$ and a counter electromotive force $E_o$ induced by rotation of the DC motor. When a current $I_a$ flows in the DC motor, the relation of the rate of rotation to the counter electromotive force $E_o$ is:

$$N = E_o / K_2 Z \Phi \quad (1)$$

where $K_2 Z \Phi$ is the counter electromotive constant. On the other hand, the relation of the load torque $T_d$ to the current $I_a$ of the DC motor is:

$$T_d = K_1 Z \Phi \cdot I_a \quad (2)$$

where $K_1 Z \Phi$ is the torque constant. Furthermore, the terminal voltage $V_m$ of the DC motor can be represented by:

$$V_m = E_o + R_o I_a. \quad (3)$$

Equation (3) can be rewritten as $E_o = V_m - R_o \cdot I_a$. As can be seen from the equation, a voltage corresponding to the speed of rotation of the motor can be detected. The detected voltage may be coupled back to a control system which in response thereto causes the DC motor to run at a constant speed irrespective of variations in the load applied to the motor.

This principle of operation is well known in the art. In order to implement this principle, it has been the practice to use an integrated circuit for the control system. As disclosed in Japanese Published Patent Application No. 58289/1977, for instance, an IC for controlling the DC motor speed is typically constructed as a three-terminal device and is connected to a small number of external passive circuit elements. An example of such a DC motor speed control device is shown in FIG. 1.

In FIG. 1, reference character M designates a DC motor; 1 a speed controlling IC; $R_t$ and $R_s$ resistors; $Q_1$ and $Q_2$ transistors; (1), (2) and (3) terminal pins, namely, an input terminal, an output terminal and a reference terminal, respectively; $I_a$ and $I_t$ currents flowing as indicated by the arrows; $R_o$ the equivalent internal resistance of the DC motor; $E_o$ the counter electromotive force of the DC motor; $E_{ref}$ a reference voltage; Vcc a supply voltage; and $1_a$ an error detecting circuit.

With the three-terminal IC as described above, a reference voltage $E_s$ which is used to set a desired rotational speed for the motor may be represented by:

$$E_s = E_{ref} + (E_{ref}/R_s) R_t. \quad (4)$$

The rotational speed of the motor is:

$$N = \frac{E_{ref} + (E_{ref}/R_s) \cdot R_t}{K_2 Z \phi} - \frac{T_d(R_o - R_t \cdot K)}{K_1 Z \phi K_2 Z \phi}. \quad (5)$$

For a three-terminal IC of this type, the reference voltage $E_s$ and the rotational speed are varied by varying the values of the external passive circuit elements, namely, $R_t$ and $R_s$.

In general, ferrite magnets have been employed as the field system of a DC motor. The counter electromotive force $E_o$ of the DC motor, being affected by the flux of the field system, has a negative temperature coefficient while the equivalent internal resistance $R_o$ of the DC motor has a positive temperature coefficient because of the armature winding. Accordingly, a resistor $R_t$ having a positive temperature coefficient is provided to compensate for the temperature dependency of the equivalent internal resistance $R_o$. However, if temperature compensation is carried out only with the resistor $R_t$, as is apparent from equation (4), the reference voltage $E_s$ must have a positive temperature coefficient making it impossible to compensate for the counter electromotive force $E_o$ having a negative temperature coefficient. Hence, the problem that the speed of rotation of the motor varies with temperature cannot be solved in this manner. If the value of the resistor $R_s$ is changed to control the speed of rotation, then the ratio of the resistance $R_t$ to the resistance $R_s$ will change as is clear from the equation (5) as a result of which the temperature coefficients will fluctuate.

SUMMARY OF THE INVENTION

In view of the foregoing, an object of the invention is to provide a small DC motor speed control device in which the voltage division point of a voltage division circuit connected between a first terminal and a third terminal is connected to a second terminal to adjust a DC motor counter electromotive force detection gain corresponding to the speed of rotation of the motor whereby a desired speed can be set merely by varying the voltage division ratio of the voltage by varying the voltage division ratio of the voltage division circuit and, without affecting the value of the resistor $R_t$, temperature compensation can be more positively achieved.

More specifically, this as well as other objects of the invention are met by a speed control device for a DC motor including a power supply having first and second power terminals with one terminal of the motor coupled to the first power terminal, a temperature compensation resistor having a first terminal coupled to the first power terminal, a voltage divider circuit coupled between a second terminal of the temperature compensation resistor and a second terminal of the motor, and a motor control circuit. The motor control circuit includes first, second, third and fourth control terminals with the fourth control terminal coupled to the second power terminal which is a ground terminal. The second control terminal is connected to a voltage dividing point of the voltage divider circuit. The motor control circuit futher includes an error detecting circuit having first and second input terminals with the first input terminal coupled through a reference voltage source to the first control terminal and with the second input terminal coupled to the second control terminal. Drive transistor means is coupled between the third control terminal and the fourth control terminal, that is, the collector and emitter of the drive transistor means are coupled therebetween and there may be a resistor coupled in series with one of the emitters and collectors. The drive transistor means may include a plurality of transistors coupled in parallel with one another. Shunt transistor means is coupled between the first control terminal and the fourth control terminal. The drive transistor means and the shunt transistor means are coupled to be driven by an output of the error detecting circuit wherein a current proportional to a load current flowing through the motor to the third control terminal flows to the first control terminal and a voltage proportional to a voltage between the first and third terminals is applied to the second control terminal.

The voltage divider circuit may include first and second resistor means coupled in series with one another. Preferably, the first and second resistor means have different temperature coefficients. There may further be provided a constant voltage drop element such as a diode having a negative temperature coefficient coupled in series with at least one of the motor, the temperature compensation resistor, the first resistor means, the second resistor means, the first control terminal and the second control terminal. The temperature compensation resistor preferably has a positive temperature coefficient. The second resistor means may be a variable resistance means. The second resistance means may also be a series connection of a fixed resistor and first and second variable resistors. The first resistor means may also be a variable resistor. Yet further, the first resistor means may include a plurality of sets of parallel-connected fixed resistors having different resistant values. In this case, there is provided switch means for selectively coupling one of the sets of parallel-connected fixed resistors into the circuit. The voltage divider circuit may be a plurality of resistor dividing circuits. In this case too, there is provided switch means for selectively coupling one of the resistor dividing circuits into the overall control circuit.

DESCRIPTION OF THE PREFERRED EMBODIMENTS

Figure 1:
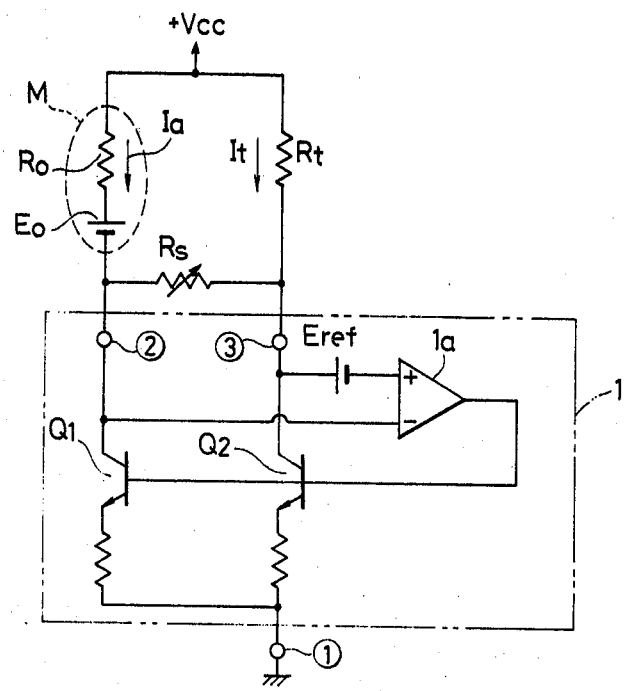
FIG. 1 is a circuit diagram showing a conventional DC motor speed control device.

A preferred embodiment of a motor speed control device of the invention will be described with reference to FIG. 2.

A DC motor speed controlling IC 10 has first through fourth terminals 1, 2, 3 and 4. The first terminal 1 is a reference terminal, the second terminal 2 is a detection terminal for detecting a voltage corresponding to the counter electromotive force $E_o$ of a motor M, the third terminal 3 is an output terminal, and the fourth terminal 4 is grounded. The collector and emitter of a shunt transistor $Q_1$ are connected through a resistor $R_1$ between the first terminal 1 and the fourth terminal 4. The collectors and emitters of drive transistors $Q_2$ through $Q_n$ are connected between the third terminal 3 and the fourth terminal 4 through resistors $R_2$ through $R_n$, respectively. The bases of the transistors $Q_1$ through $Q_n$ are commonly connected to the output terminal of an error detecting circuit 10a.

The error detecting circuit 10a may, for example, be a differential amplifier. A reference voltage source $E_{ref}$ is connected between a first of the two input terminals of the error detecting circuit 10a and the first terminal 1. The second input terminal of the circuit 10a is connected to the second terminal 2. A constant current source $I_r$ is connected between the first terminal of the error detecting circuit 10a and the fourth terminal.

The external passive element circuit of the speed controlling IC 10 includes the DC motor M which is connected between the third terminal 3 and an electric source terminal Vcc. A resistor $R_t$ is connected between the terminal Vcc and the first terminal 1. Furthermore, a voltage division circuit constituted by series-connected resistors $R_a$ and $R_b$ is connected between the first and third terminals 1 and 3. The voltage division or connection point of the voltage division circuit is connected to the second terminal 2.

The operation of the small-motor speed control device thus assembled will now be described. The internal parameters of the speed controlling IC 10, specifically, the reference voltage source $E_{ref}$ and the current source $I_r$ are designed to be considerably stable even if the supply voltage or the ambient conditions vary.

The current $I_a$ flowing in the DC motor can be represented by:

$$I_a = K \cdot I_t \quad (6)$$

where $I_t$ is the current which flows in the resistor $R_t$ in proportion to the current $I_a$ and K is a constant.

If a small bias current flowing through the resistor $R_t$ to operate the IC 10 and a small current flowing through the resistors $R_a$ and $R_b$ from that flowing through resistor $R_t$ are represented by $I_r$ and $I_s$, respectively, the small current $I_s$ can be represented by:

$$I_s = E_{ref}/R_a. \quad (7)$$

Figure 2:
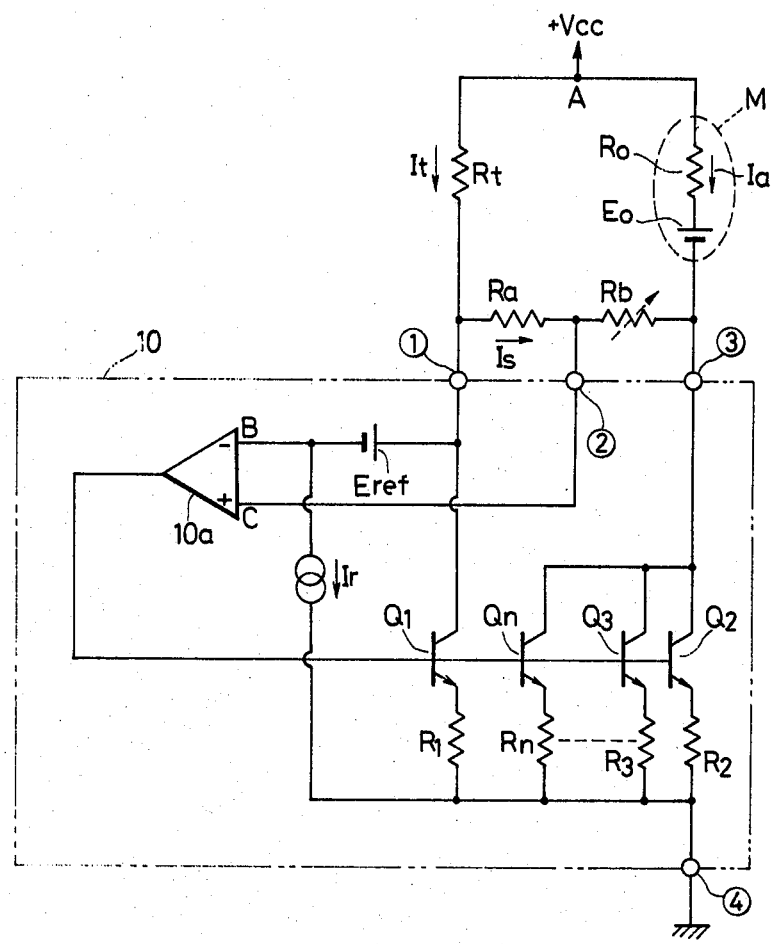
FIG. 2 is a circuit diagram showing an example of a DC motor speed control device according to the invention.

As is apparent from a consideration of the circuitry of FIG. 2, a voltage $V_{AB}$ developed between the electric source terminal Vcc and the first input terminal of the error detecting circuit 10a is:

$$V_{AB} = E_{ref} + I_s R_t + I_r R_t + I_t R_t. \quad (8)$$

Equation (8) can be closely approximated by the following equation (8') because the currents $I_r$ and $I_s$ can be set to values much smaller than the current $I_t$.

$$V_{AB} = E_{ref} + I_t R_t. \quad (8')$$

The voltage $V_{AC}$ developed between the electric source terminal Vcc and the second input terminal of the error detecting circuit 10a, that is, developed across the terminal Vcc, the DC motor M, the resistor $R_b$ and the second input terminal of the error detecting circuit 10a, can be expressed by:

$$V_{AC} = E_o + I_a \cdot R_o - E_{ref} R_b / R_a. \quad (9)$$

Figure 3:
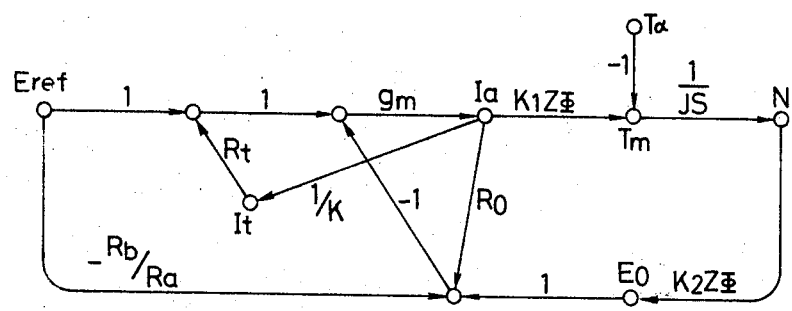
FIG. 3 is a signal flow graph of a control system in the circuit in FIG. 2.

The relations of the equations described with respect to the circuit of FIG. 2 are indicated by the signal flow graph of FIG. 3 in which reference character $g_m$ designates the voltage-current gain of the error detecting circuit 10a, $T_d$ is the load torque of the DC motor M, J the inertia moment of the rotor, and s the LaPlacean variable.

In general, the gain $g_m$ can be set to a very high value. Therefore, if $g_m = \infty$, then the speed of the motor expressed by the number N of revolutions per minute with respect to the reference voltage $E_{ref}$ is:

$$\frac{N(s)}{E_{ref}(s)} = \frac{(1 + R_b/R_a)/K_2 Z\phi}{s\{J(R_o - R_t/K)/K_1 Z\phi K_2 Z\phi\} + 1} \quad (10)$$

On the other hand, the number N of revolutions per minute with respect to the load torque $T_d$ is:

$$\frac{N(s)}{T_d(s)} = \frac{-(R_o - R_t \cdot K)/K_1 Z\phi K_2 Z\phi}{s\{J(R_o - R_t/K)/K_1 Z\phi K_2 Z\phi\} + 1} \quad (11)$$

The static characteristic of the number of revolutions per minute may be obtained from equations (10) and (11) by setting s=0, that is:

$$N = E_{ref}(1+R_b/R_a)/(K_2 Z\Phi) - T_d \cdot (R_o - R_t/K)/(K_1 Z\Phi K_2 Z\Phi) \quad (12)$$

The equation (12) is a fundamental equation representing the number of revolutions per minute set by the control device shown in FIG. 2.

The second term of the fundamental equation (12) is representative of a load gradient and is equal to the second term of equation (5) described with reference to the conventional example. Temperature variation with respect to this term can be cancelled by making the temperature coefficient of the resistor $R_t$ approximately the same as the temperature coefficient of the equivalent internal resistance $R_o$. The temperature coefficient of the equivalent internal resistance $R_o$ of an ordinary DC motor M is about +0.4%/°C. or more. The resistor $R_t$ is provided with a positive temperature coefficient to effect temperature compensation with respect to the equivalent internal resistance.

Accordingly, the load gradient is not at all affected by temperature variations because the first term of the equation is not dependent on the value $R_t$. The motor speed can be adjusted by varying the voltage division ratio of the voltage division circuit composed of the resistors $R_a$ and $R_b$ as is evident from the first term of equation (12).

In FIG. 2, the reference voltage source $E_{ref}$ is connected between the first terminal 1 and the first input terminal of the error detecting circuit 10a. However, the reference voltage source may be connected to the second terminal 2 and the other input terminal of the circuit 10a. Alternatively, two reference voltage sources may be connected to the two input terminals of the circuit 10a in the same manner as described above.

As is apparent from the above description, according to the invention, the voltage division circuit is connected between the first and third terminals 1 and 3 and the voltage division point of the voltage division circuit is connected to the second terminal 2 so that the first term of the equation (12) is not dependent on the value of the resistor $R_t$. Therefore, even if the resistor $R_t$ has a positive temperature coefficient as indicated by the first term in the above-described equation (5) relating to the conventional device, the first term will have, as a whole, a positive temperature coefficient cancelling the negative temperature coefficient of the constant $K_2 Z\Phi$ and thus achieving appropriate temperature compensation. It is also possible to provide an entirely negative temperature coefficient.

When the temperature coefficients of the resistors $R_a$ and $R_b$ are different, for example, when the temperature coefficient of the resistor $R_a$ is larger than that of the resistor $R_b$, the ratio $R_b/R_a$ in equation (12) can be reduced with an increase in temperature even if the flux $\Phi$ is reduced as the temperature increases. Therefore variations in the flux $\Phi$ are cancelled by the variation of the ratio $R_b/R_a$ so that the rotational speed N is maintained very nearly constant regardless of a temperature rise. Thus, variations in the flux are well compensated for.

Figure 4:
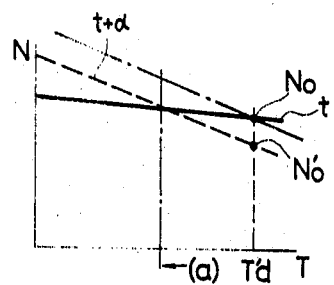
FIG. 4 is a graph showing a relation between rotational speed and the load torque when a control signal is applied.

If the temperature coefficient of the resistor $R_a$ is smaller than that of the resistor $R_b$, variations of both the flux and the value of the resistor $R_t$ can be cancelled. That is, as shown in FIG. 4, in which a solid line represents the relationship between the rotational speed N and the load torque $T_d$ for $R_t/K=R$ at a temperature t, the rotational speed N is influenced to some extent by variations in the load torque since $R_t$ can, as a practical matter, be set only approximately to the desired value so that $R_t/K=R$ although it may be set so that $R_t/K=R_o$ theoretically. A dotted line represents the rotational speed N when the temperature rises from t to $t+\alpha$. When the rotational speed becomes $N_o'$. In this case, the ratio $R_b/R_a$ in equation (12) increases and the flux $\Phi$ decreases with an increase in the temperature. Therefore the first term $E_{ref}(1+R_b/R_a)/K_2 Z\Phi$ increases. The rotational speed N in this case is shown by a chain line in FIG. 4. Thus, it is possible to make the rotational speed N for a load torque $T_d$ at temperature $t+\alpha$ approximately the same as the rotational speed N with the some load torque $T_d$ at temperature t. That is, in this case, it is possible to maintain the rotational speed N constant even if the flux $\Phi$ and the value of the resistor $R_t$ vary.

Figure 5:
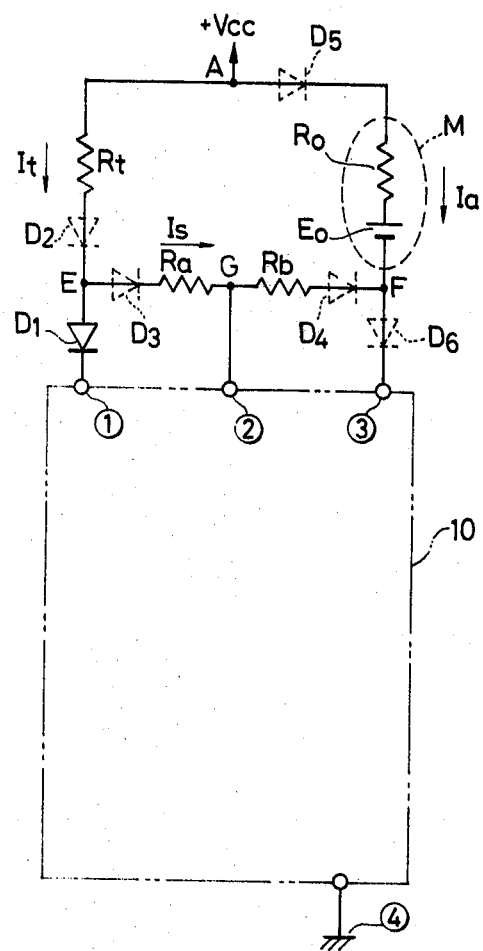
FIG. 5 is a circuit diagram of another embodiment of the present invention.

FIG. 5 shows a modification of the control circuit shown in FIG. 2. In FIG. 5, a diode $D_1$ having a negative temperature coefficient is connected between the resistor $R_t$ and the terminal (1) with the cathode of the diode $D_1$ connected to the terminal (1).

With the use of the diode $D_1$, when the flux $\Phi$ decreases, the term relating to non-load variations in equation (12), which may be rewritten for this case as $(E_{ref}+V_F)(1+R_b/R_a)$ where $V_F$ is the forward drop of the diode $D_1$, decreases and hence the line $N_o'$ is shifted toward the line $N_o$. Thus, rotational speed variations with or without a load due to temperature variations are reduced by the addition of the diode $D_1$ which has a negative temperature coefficient. Instead of or in addition to the diode $D_1$, it is possible to connect a diode $D_2$ between the resistor $R_A$ and the point E and/or a diode $D_4$ between the points G and F. When a large load is used, diodes $D_3$, $D_5$ and $D_6$ may be connected between the point E and G, between the source terminal $+V_{cc}$ and the motor and the point F and the third terminal (3), respectively. In any of these cases, temperature compensation is improved.

In the embodiment shown in FIG. 2, when a resistor $R_t$ having a position temperature coefficient is used, the load characteristic is kept stable irrespective of temperature variations because the value of the resistor $R_t$ changes in proportion to the ambient temperature with substantially no self heating because the magnitude of current $I_s$ is quite small. Thus even when the temperature varies and the load is changed, the rotational speed of the motor is maintained stable.

Figure 6:
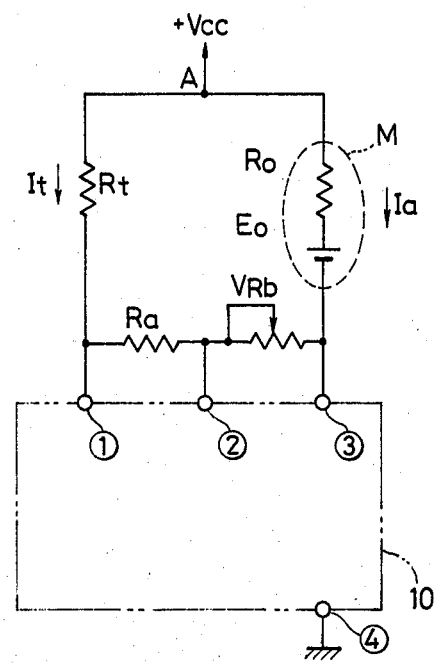
FIGS. 6 to 12 are circuit diagrams of still further other embodiments of the present invention.

In FIG. 6 shows another embodiment in which, instead of a fixed resistor $R_b$, a variable resistor $V_{Rb}$ is used. As in the case of the embodiment of FIG. 2, the rotational speed N is proportional to the value of the resistor $R_b$ as indicated by the equation (12). Therefore, when a variable resistor $V_{Rb}$ is used instead of a fixed resistor $R_b$, the rotational speed can be easily changed by changing the value of the variable resistor.

Figure 7:
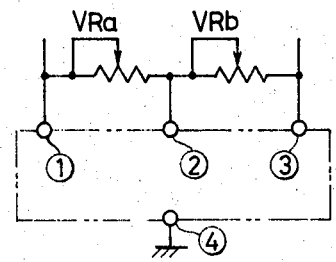

In an embodiment shown in FIG. 7, the resistor $R_a$ is replaced by a variable resistor $V_{Ra}$. Since the value of the resistor $R_a$ is in reverse proportion to the rotational speed, it is possible with this embodiment to finely regulate the speed by changing the value of the variable resistor $V_{Rb}$.

Figure 8:
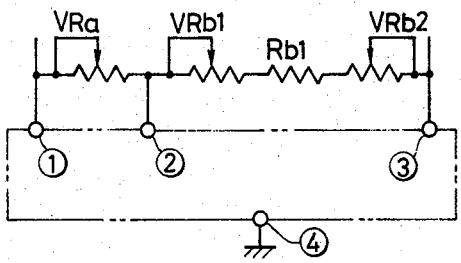

In the embodiment of FIG. 8, the resistors $R_a$ and $R_b$ in FIG. 2 are replaced by a variable resistor $V_{Ra}$, a series combination of a fixed resistor $R_{b1}$ and a pair of variable resistors $V_{Rb1}$ and $V_{Rb2}$. This embodiment is particularly advantageous for use in a tape recorder or the like in which the tape speed must be precisely regulated. In this embodiment, the variable resistor $V_{Rb1}$ is initially set and then the value of the variable resistor $V_{Rb1}$ is adjusted to set the rotational speed to a suitable value near the precise speed desired. Thereafter the variable resistor $V_{Rb2}$ is adjusted so that the tape speed is precisely the desired value.

Figure 9:
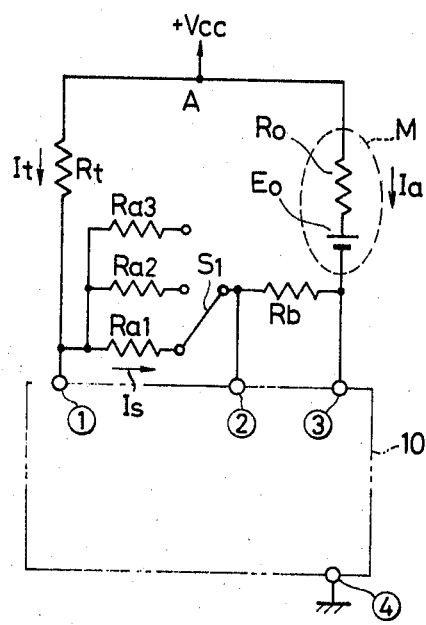

FIG. 9 shows another embodiment in which the resistor $R_a$ in FIG. 2 has been replaced by a plurality of parallel resistors $R_{a1}$, $R_{a2}$ and $R_{a3}$ which have different values and are selectively connected into the circuit by a switch S1. With this embodiment, the motor speed can be changed in a step manner. In this case, the temperature coefficients of the resistors $R_{a1}$ to $R_{a3}$ and $R_b$ are substantially the same regardless of the values thereof. Resistance changes of the resistors $R_b$ and one of the resistors $R_{a1}$ to $R_{a3}$ due to temperature changes are cancelled out and so the rotational speeds provided by the respective resistors $R_{a1}$ to $R_{a3}$ are stable. Even during the transition time in switching between the resistors $R_{a1}$, $R_{a2}$ and $R_{a3}$ during which time the second terminal 2 may be floating, any noise variation which might otherwise be produced in the error detection circuit 2a is prevented because the second terminal 2 is still connected to the resistor $R_b$ and the internal impedance of the circuit 2a is high.

Figure 10:
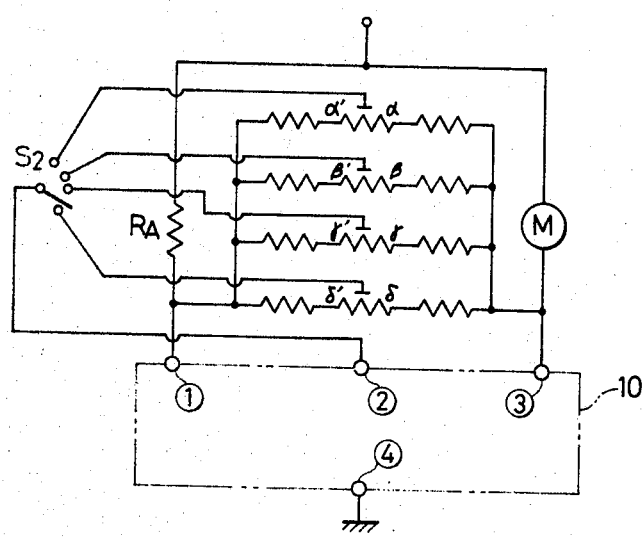
Figure 11:
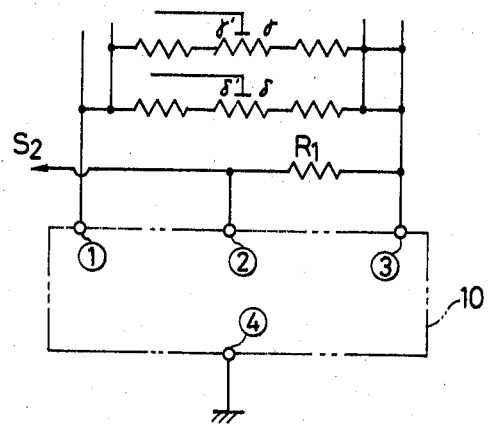
Figure 12:
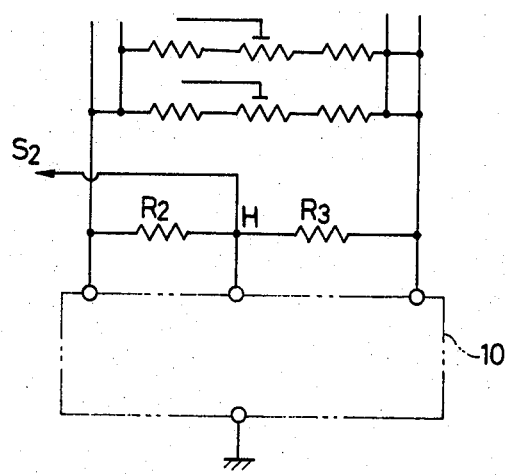

FIGS. 10, 11 and 12 show still further embodiments in each of which the voltage divider circuit is constituted by a resistor ($R_4$ in FIG. 10, $R_1$ in FIG. 11, and $R_2$ and $R_3$ in FIG. 12) and a plurality of parallel voltage dividers each being a plurality of series-connected resistors. Each of the voltage dividing points are connected selectively to the terminal 2 through a switch S2.

In the conventional device, the resistance $R_s$ is changed to adjust the rotational speed. Even if the resistor $R_t$ has a positive temperature coefficient as described above, the temperature coefficient is changed because of the ratio of resistances $R_t/R_s$. On the other hand, with the invention, the resistance $R_t$ is eliminated from the first term of the equation (12). Therefore, the motor speed is controlled by the voltage division ratio of the voltage division circuit and no temperature coefficient change is present.

In the conventional device, when the temperature of the resistor $R_s$ is changed, the rotational speed of the motor changed as well. On the other hand, in the device of the invention, a voltage division ratio is employed which can be maintained constant with respect to temperature variation. Accordingly, even if a temperature variation occurs, the motor speed is stably maintained.

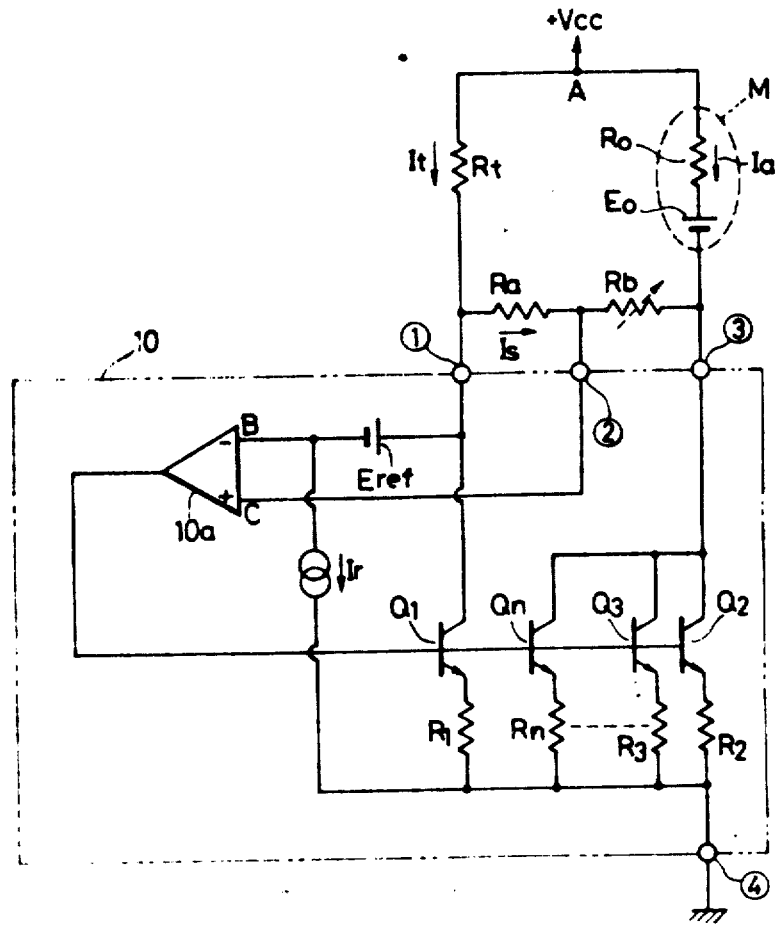

What is claimed is:

1. A speed control device for a DC motor comprising: a power supply having first and second power terminals, one terminal of said motor being coupled to said first power terminal; a first resistor having a first terminal coupled to said first power terminal; a voltage divider circuit coupled between a second terminal of said first resistor and a second terminal of said motor; and a motor control circuit having first, second, third and fourth control terminals, said fourth control terminal being coupled to said second power terminal which is a ground terminal, said second control terminal being connected to a voltage dividing point of said voltage divider circuit, said motor control circuit further including a reference voltage source, an error detecting circuit having first and second input terminals, said first input terminal being coupled through said reference voltage source to said first control terminal and said second input terminal being coupled to said second control terminal, drive transistor means coupled between said third control terminal and said fourth control terminal, and shunt transistor means coupled between said first control terminal and said fourth control terminal, said drive transistor means and said shunt transistor means being coupled to be driven by an output of said error detecting circuit wherein a current proportional to a load current flowing through said motor to said third control terminal flows to said first control terminal and a voltage proportional to a voltage between said first and third terminals is applied to said second control terminal the control being performed so that the voltage at said second control terminal becomes equal to the reference voltage.

2. The speed control device for a DC motor of claim 1 wherein said voltage divider circuit comprises first and second resistor means connected in series with each other.

3. The speed control device for a DC motor of claim 2 wherein said first and second resistor means have different temperature coefficients.

4. The speed control device for a DC motor of claim 2 or 3 further comprising at least one constant voltage drop element having a negative temperature coefficient connected in series with at least one of said motor, said first resistor, said first resistor means, said second resistor means, said first control terminal and said second control terminal.

5. The speed control device for a DC motor of any one of claims 1 to 3 wherein said first resistor is a temperature compensation resistor having a positive temperature coefficient.

6. The speed control device for a DC motor of either of claims 2 and 3 wherein said second resistor means comprises variable resistance means.

7. The speed control device for a DC motor of either of claims 2 and 3 wherein said second resistor means comprises variable resistance means, said variable resistance means including a series connection of a fixed resistor and first and second variable resistors.

8. The speed control device for a DC motor of either of claims 2 and 3 wherein said first resistor means is a variable resistor.

9. The speed control device for a DC motor of either of claims 2 and 3 wherein said first resistor means includes a plurality of sets of parallel-connected fixed resistors having different resistance values and further comprising switch means for selectively coupling ones of said sets of parallel-connected fixed resistors in circuit.

10. The speed control device for a DC motor of claim 1 wherein said voltage divider circuit comprises a plurality of resistor dividing circuits and further comprising means for selectively coupling ones of said resistor dividing circuits in circuit.

11. The speed control device for a DC motor of claim 1 wherein said error detecting circuit comprises a differential amplifier.

12. The speed control device for a DC motor of claim 1 further comprising constant current source means coupled between said first input terminal and said fourth control terminal.

* * * * *

UNITED STATES PATENT AND TRADEMARK OFFICE
CERTIFICATE OF CORRECTION

PATENT NO. : 4,350,937
DATED : September 21, 1982
INVENTOR(S) : Kiyoshi Miyazaki et al.

It is certified that error appears in the above-identified patent and that said Letters Patent is hereby corrected as shown below:

The title page should be deleted to appear as per attached title page.

Signed and Sealed this

Fourth Day of September 1984

[SEAL]

Attest:

Attesting Officer

GERALD J. MOSSINGHOFF

Commissioner of Patents and Trademarks

United States Patent
Miyazaki et al.

[11] 4,350,937
[45] Sep. 21, 1982

[54] MOTOR SPEED CONTROL DEVICE FOR DC MOTOR

[75] Inventors: Kiyoshi Miyazaki, Komagane; Tsuneto Takeuchi; Jinichi Ito, both of Ina; Hiroo Ashibe, Nagano, all of Japan

[73] Assignee: Kabushiki Kaisha Sankyo Seiki Seisakusho, Nagano, Japan

[21] Appl. No.: 174,429

[22] Filed: Aug. 1, 1980

[30] Foreign Application Priority Data

| Aug. 4, 1979 | [JP] | Japan | 54/99620 |
| Aug. 31, 1979 | [JP] | Japan | 54/120224[U] |
| Sep. 4, 1979 | [JP] | Japan | 54/122205[U] |
| Sep. 6, 1979 | [JP] | Japan | 54/123169[U] |
| Nov. 7, 1979 | [JP] | Japan | 54/154468[U] |
| Nov. 12, 1979 | [JP] | Japan | 54/156744[U] |

[51] Int. Cl.³ .................................. H02P 5/16
[52] U.S. Cl. ...................... 318/331; 318/345 CA
[58] Field of Search ..................... 318/331, 345 CA

[56] References Cited
U.S. PATENT DOCUMENTS

| 3,521,140 | 7/1970 | Kobayashi et al. | 318/331 |
| 3,560,828 | 2/1971 | Kobayashi et al. | 318/332 |
| 3,624,493 | 11/1971 | Gatley | 323/22 T |
| 4,189,666 | 2/1980 | Tetsuga et al. | 318/331 |

Primary Examiner—David Smith, Jr.
Attorney, Agent, or Firm—Sughrue, Mion, Zinn, Macpeak & Seas

[57] ABSTRACT

A motor speed control device for a small DC motor in which the speed of rotation of the motor is maintained stable during ambient temperature changes and changes in the load applied to the motor. A temperature compensation resistor is coupled in series with a voltage divider circuit and the combination thereof coupled across the motor. A motor control circuit is provided having first through fourth control terminals. The first control terminal is coupled to the junction between the temperature compensation resistor and the voltage divider circuit, the second control terminal to the voltage division point, the third control terminal to the junction between the voltage divider circuit and the motor, and the fourth control terminal is coupled to ground. The motor control circuit includes an error detecting circuit having inputs coupled to the first and second control terminals with a voltage reference source coupled in series with the first input terminal to the error detecting circuit. The output of the error detecting circuit drives both shunt transistors coupled between the first and fourth control terminals and a drive transistor means coupled between the first and fourth control terminals.

12 Claims, 12 Drawing Figures